F. A. SCHEFFER.
BAG HOLDING ATTACHMENT FOR TRUCKS.
APPLICATION FILED JAN. 7, 1909.
919,251.
Patented Apr. 20, 1909.
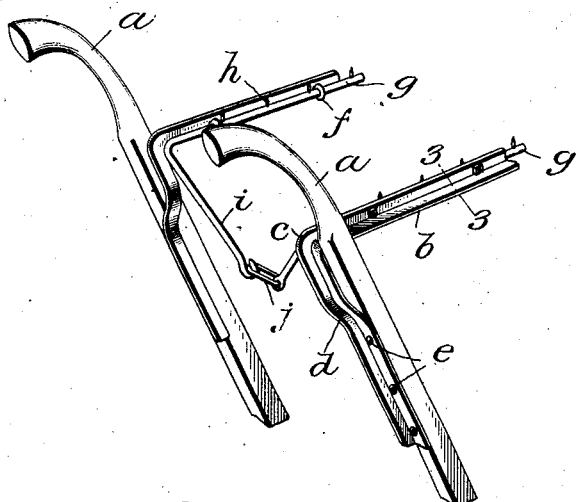
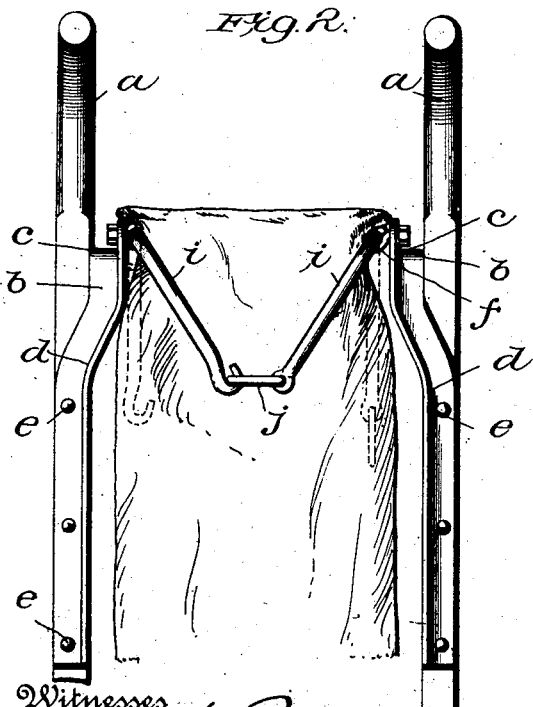
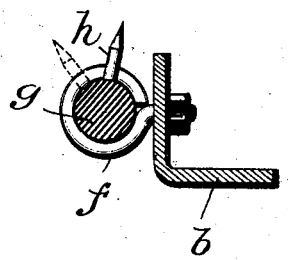
Witnesses
Geo. A. Byrne.
A. W. Neale Jr.
Inventor
F. A. Scheffer,
By Wilkinson, Fisher & Witherspoon
Attorneys

UNITED STATES PATENT OFFICE.

FREDRIC ALBERT SCHEFFER, OF MONTEGUT, LOUISIANA.

BAG-HOLDING ATTACHMENT FOR TRUCKS.

No. 919,251. Specification of Letters Patent. Patented April 20, 1909.

Application filed January 7, 1909. Serial No. 471,171.

*To all whom it may concern:*

Be it known that I, FREDRIC ALBERT SCHEFFER, a citizen of the United States, residing at Montegut, in the parish of Terrebonne and State of Louisiana, have invented certain new and useful Improvements in Bag-Holding Attachments for Trucks; and I do hereby declare the following to be a full, clear, and exact description of the invention, such as will enable others skilled in the art to which it appertains to make and use the same.

My invention relates to improvements in bag holding attachments for trucks, and the object of my invention is to produce a simple bag holding attachment which can readily be fastened to the handles of a truck.

With this object in view, my invention consists in the construction and combinations of parts as hereinafter described and claimed.

In the accompanying drawings—Figure 1 is a perspective view of the upper part of a truck, showing my attachment applied thereto. Fig. 2 is a rear view of the same, and Fig. 3 is a cross section on the line 3—3 of Fig. 1.

*a* represents the handles of an ordinary truck, to which my bag holding attachment is applied.

*b* represents angle iron arms which are bent so as to form one portion which may be attached to one of the truck handles, and another portion extending parallel to the floor. Each of these angle irons is bent at *c* and *d* so that it may be fastened to the rear of one of the truck handles and extend up on the inside thereof, and then forward parallel to the floor. These angle irons are removably secured by bolts *e* to the truck handles. Each angle iron *b* on the inside is provided with a series of eye bolts *f*, through which passes a rod *g*, provided with a series of sharp pins *h*. Each of the rods *g* is bent in the general shape of the arms *b*, and terminates in a downwardly projecting portion *i*, nearly parallel to the truck handle. A link *j* is fastened in one of the parts *i* and is adapted to engage a hook in the corresponding part. If no strain is put upon these rods, they naturally occupy the position shown in dotted lines in Fig. 2.

The operation is as follows:—The parts being in the position shown in dotted lines in Fig. 2, a bag is placed upon the pins *h* and the rods *i* are then turned and fastened together by the link *j*. This holds the bag firmly in place as long as desired. When it is desired to release the bags, the link *j* is disengaged and the rods *i* fall, releasing the bag.

Having thus described my invention, I claim:—

1. The combination of truck handles, and a bag holding attachment secured thereto, said attachment including bent arms, one part of which is adapted to be attached to one of the truck handles, toothed rods pivotally mounted in the other part of said arms, each rod being provided with a downwardly bent portion and means for fastening the lower ends of said rods together, substantially as described.

2. The combination of truck handles and a bag holding attachment adapted to be secured thereto, consisting of two bent angle arms, one of said arms being attached to each of said handles, eye bolts in said arms, toothed rods rotatably mounted in said eye bolts, each of said rods having one end bent downwardly and a link for securing the downwardly bent ends of said rods together, substantially as described.

In testimony whereof I affix my signature, in presence of two witnesses.

FREDRIC ALBERT SCHEFFER.

Witnesses:
 AUBIN DAIGLE,
 J. C. DUPONT.